(No Model.)

J. C. LOOK.
CAR COUPLING.

No. 272,386. Patented Feb. 13, 1883.

WITNESSES:
Thos. Houghton.
Edw. W. Byrn.

INVENTOR:
J. C. Look
BY Munn & Co
ATTORNEYS.

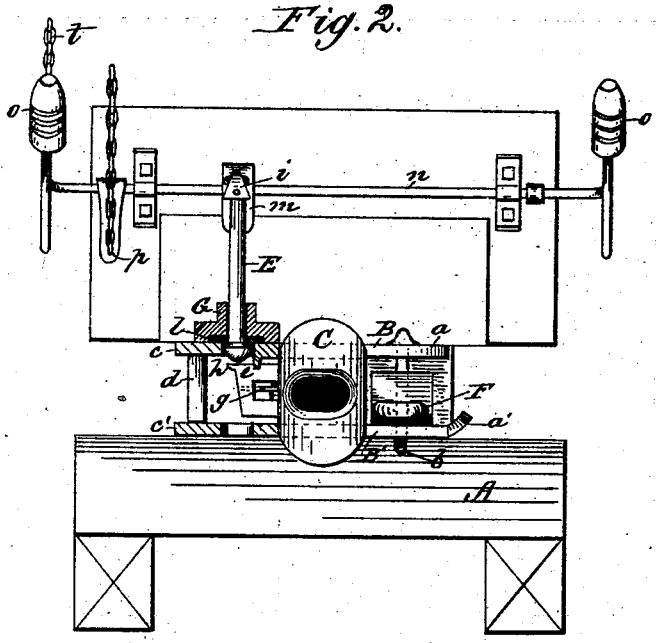

UNITED STATES PATENT OFFICE.

JOHN C. LOOK, OF YUBA CITY, CALIFORNIA.

CAR-COUPLING.

SPECIFICATION forming part of Letters Patent No. 272,386, dated February 13, 1883.

Application filed January 3, 1883. (No model.)

*To all whom it may concern:*

Be it known that I, JOHN C. LOOK, of Yuba City, in the county of Sutter and State of California, have invented a new and useful Improvement in Car-Couplings; and I do hereby declare that the following is a full, clear, and exact description of the same, reference being had to the accompanying drawings, forming part of this specification, in which—

Figure 1:
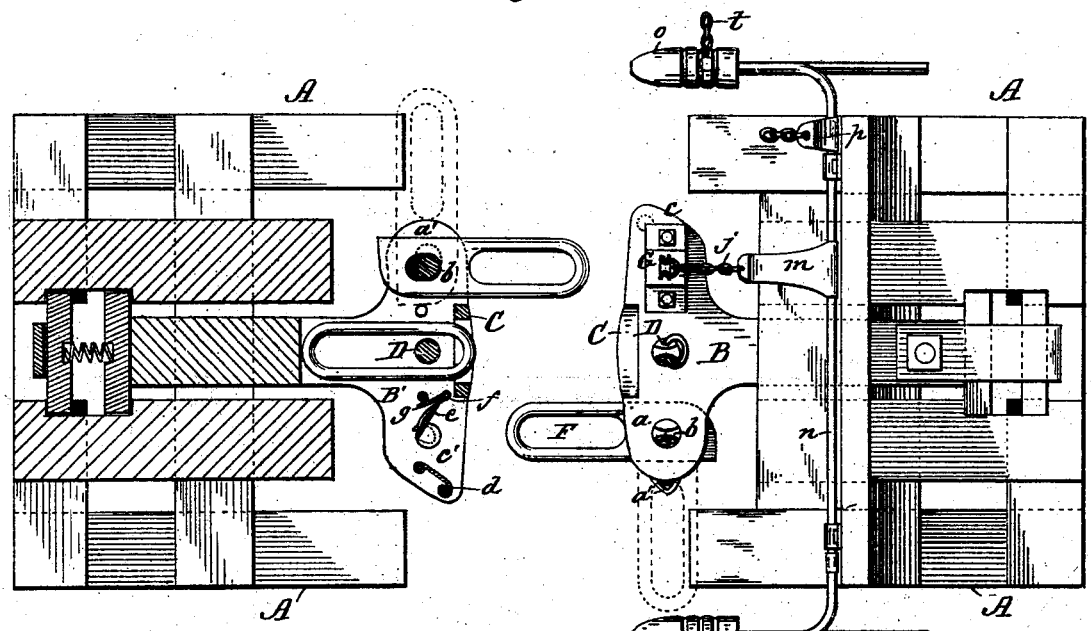
Figure 5:
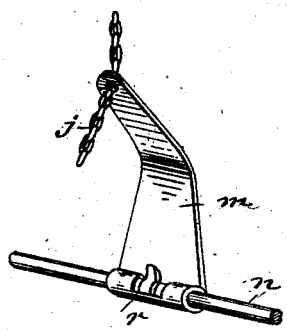

Figure 1 is a plan view of two of my couplings juxtaposed, the one on the left being shown in horizontal section. Fig. 2 is a front end elevation, partly in section. Fig. 3 is a side elevation, partly in section. Fig. 4 is an underneath view of the block which sustains the automatic coupling-pin. Fig. 5 is a detail, showing the loose connection of arm $m$ to shaft $n$.

My invention relates to an improved car-coupling designed to secure the automatic coupling of the cars, and to insure a firm and strong connection between the same.

It consists, mainly, in a draw-head having the usual link-throat and pin-hole, and provided on one side with upper and lower laterally-projecting flange with pin-holes, which flange forms a connection for a permanently-attached link, and which draw-head is provided on the other side with upper and lower flanges with tapering walls between, one of which is in the nature of a yielding wing that sustains the pin, and, when pushed aside by the entering link of the other car, allows the pin to drop through.

The invention also consists in the peculiar construction of the parts in detail, as will be hereinafter more fully described.

In the drawings, A represents a part of the frame-timbers at the end of the car, to which the draw-head B is attached in the usual manner. This draw-head is composed of upper and lower wrought-iron plates, B and B', connected together by vertical bolts, and having at the front end an oval face-plate, C. This face-plate forms, with the plates B and B', a link-throat of the ordinary construction, and, with the pin-holes and pin D immediately behind it, adapts my improved coupling to be connected with cars of the ordinary construction which are not provided with my improvements. On one side of the face-plate C the plates of the draw-bar are extended laterally to form flanges $a$ $a'$, which are pierced by a pin-hole, and provided with a pin, $b$, that passes through a hole in a special form of link F. This link is designed to be permanently held in the draw-head by this pin, and when it is to be in use it is turned outwardly or longitudinally with the car, and when it is not required it is turned at right angles to the car, as shown in dotted lines in Fig. 1. This link has its inner end made solid and heavy to hold its outer end in horizontal position, and this solid end is pierced by a pin-hole, which is made elongated for the purpose hereinafter described. To hold the link in its right-angular position, as shown by dotted lines, the lower flange, $a'$, is bent upwardly, and when the link is turned to the right-angular position the two branches of the link rest upon opposite sides of the upturned end of the flange $a'$; and as this movement requires the link to be slightly raised at its outer end, the pin-hole through its heavy end must be elongated to permit said elevation. On the opposite side of the draw-bar the plates B B' are extended laterally to form flanges $c$ $c'$, which, together with the inclined wall $d$ and spring-wing $e$, form the throat for automatic coupling. The spring-wing is pivoted upon a vertical bolt, $f$, and is held forward by a spring, $g$, so that a flange, $h$, at its upper edge rests beneath the pin-hole in the flange $c$ and sustains the automatic coupling-pin E. When the link F of the opposite car enters the coupling-throat, it forces the spring-wing back and allows the pin to fall through and couple the link; and as the coupling is a double coupling, this action, it will be seen, takes place upon both sides the central link-throat.

In fitting the coupling-pin E it is made larger at the bottom, and is inserted in the draw-bar from below, and is then fastened by a shackle and pin, $i$, to a lifting-chain, $j$. The object in making the lower end larger is to prevent it from being lifted out of place. This pin is sustained when in elevated position by a block, G, fastened to the top of the flange $c$, Figs. 2 and 4. The hole in this block, and also in the flanges $c$ and $c'$, are made larger than the pin, so that the latter can move freely through them, while between the block and flange $c$ is a washer, l, the perforation in which fits the pin closely and prevents it from being lifted out.

For raising the pin into elevated position its chain is attached to an arm, m, fixed loosely on a rock-shaft, n, which shaft has crank-arms extending to each side of the car, and counterweights o to sustain the pin when raised. When the cars are to be coupled automatically, the position of the counter-weight is reversed, so that the pin can descend, and in this position an arm, p, acts as a stop to define the movement of the counter-weight, and also a connection for a chain for raising the pin from the top of the car. The lifting-arm m, it will be seen, is loosely connected to the rock-shaft, and is operated upon by a lug, r, on said shaft, so as to allow the full movement of the counter-weight in swinging from one side to the other. t is a chain for operating the counter-weight from the top of the car.

In some cases I may find it desirable to hold the pin up independently of the mechanism just described; and for this purpose a curved wedge-shaped piece of metal, S, (see Fig. 4,) is arranged in a recess under the block G, and when turned in one direction causes the washer l to pinch or bind against the pin.

Having thus described my invention, what I claim as new is—

1. The draw-bar B B', having a central coupling-throat, with pair of laterally-projecting flanges a a' on one side, with pin-hole, pin, and weighted link, and a pair of laterally-projecting flanges, c c', on the other side, with automatic pin and spring-seated wing for sustaining it, as described.

2. The draw-bar having laterally-projecting flanges a and a', the latter formed with an upturned end, in combination with the link having a weighted end, with an oblong hole in the same and a pin passing through the same, as described.

3. The draw-bar having laterally-projecting flanges c c', combined with inclined wall d, spring-wing e, and a coupling-pin arranged to be sustained by the spring-wing, substantially as described.

4. The coupling-pin E, made larger at its lower end, combined with the draw-bar having perforated flanges c c', the block G, and the intermediate washer, l, having a hole of less size than the holes in the draw-bar flanges, substantially as and for the purpose described.

JOHN C. LOOK.

Witnesses:
EDWD. W. BYRN,
SOLON C. KEMON.